(12) United States Patent
Phinney (10) Patent No.: US 7,291,938 B2
(45) Date of Patent: Nov. 6, 2007

(54) POWER SUPPLY APPARATUS AND METHOD BASED ON PARASITIC POWER EXTRACTION

(75) Inventor: Thomas L. Phinney, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 498 days.

(21) Appl. No.: 10/463,686

(22) Filed: Jun. 17, 2003

(65) Prior Publication Data

US 2004/0256915 A1   Dec. 23, 2004

(51) Int. Cl.
H02J 3/02 (2006.01)
H02J 9/00 (2006.01)
H02M 7/02 (2006.01)

(52) U.S. Cl. .............................. 307/73; 307/3; 713/310
(58) Field of Classification Search .................... 307/2, 307/53, 72, 73, 3, 21, 27, 28, 44; 713/310; 455/572; 379/348; 327/545
See application file for complete search history.

(56) References Cited

U.S. PATENT DOCUMENTS

| | | | | |
|---|---|---|---|---|
| 3,974,397 A * | 8/1976 | Killough, Jr. | ................. | 307/82 |
| 4,126,793 A * | 11/1978 | de Vries | ...................... | 307/129 |
| 4,184,197 A | 1/1980 | Cuk et al. | | |
| 4,208,594 A * | 6/1980 | Guicheteau | ................. | 327/545 |
| 4,257,087 A | 3/1981 | Cuk | | |
| 4,274,133 A | 6/1981 | Cuk et al. | | |
| 4,344,124 A * | 8/1982 | Panicali | ....................... | 363/49 |
| 4,677,646 A * | 6/1987 | Dodds et al. | ................ | 375/257 |
| 5,442,534 A | 8/1995 | Cuk et al. | | |
| 5,442,539 A | 8/1995 | Cuk et al. | | |
| 5,570,276 A | 10/1996 | Cuk et al. | | |
| 5,642,267 A | 6/1997 | Brkovic et al. | | |
| 5,790,005 A | 8/1998 | Santi et al. | | |
| 5,790,394 A * | 8/1998 | Cabaniss et al. | ............... | 363/65 |
| 5,808,376 A * | 9/1998 | Gordon et al. | ................. | 307/66 |
| 5,903,139 A * | 5/1999 | Kompelien | .................. | 323/282 |
| 5,952,733 A * | 9/1999 | Johnston | ....................... | 307/44 |
| 6,008,998 A * | 12/1999 | Han | ............................ | 363/16 |
| 6,295,356 B1 * | 9/2001 | De Nicolo | ................... | 379/413 |
| 6,304,460 B1 | 10/2001 | Cuk | | |
| 6,388,896 B1 | 5/2002 | Cuk | | |
| 6,400,579 B2 | 6/2002 | Cuk | | |

(Continued)

FOREIGN PATENT DOCUMENTS

JP    03248612 A  *  11/1991

*Primary Examiner*—Michael Sherry
*Assistant Examiner*—Andrew Deschere
(74) *Attorney, Agent, or Firm*—Ohlandt, Greeley, Ruggiero & Perle, LLP (57) ABSTRACT

Power supply apparatus and method based on parasitic power extraction is disclosed. Power is extracted from signals that are inbound and/or outbound from an equipment. The extracted power is converted to dc voltages for a device associated with the equipment. The positive portions of the extracted power are combined in an additive manner to provide a first potentially time-varying signal and negative portions of the extracted power are also combined in an additive manner to provide a second potentially time-varying signal. The two potentially time-varying signals are also combined in an additive manner and divided into the desired number of dc voltages and magnitudes. An optional dc voltage power source is provided should the extracted power be inadequate to provide the dc voltages.

25 Claims, 7 Drawing Sheets

U.S. PATENT DOCUMENTS

| | | |
|---|---|---|
| 6,462,962 B1 | 10/2002 | Cuk |
| 6,535,983 B1 * | 3/2003 | McCormack et al. ....... 713/310 |
| 6,657,418 B2 * | 12/2003 | Atherton ..................... 323/282 |
| 6,677,687 B2 * | 1/2004 | Ho et al. ..................... 307/43 |
| 6,839,252 B2 * | 1/2005 | Tai et al. ..................... 363/65 |
| 6,970,725 B1 * | 11/2005 | Luetzenkirchen et al. .. 455/572 |
| 6,995,658 B2 * | 2/2006 | Tustison et al. ............ 375/219 |
| 7,154,381 B2 * | 12/2006 | Lang et al. ............ 340/310.11 |

* cited by examiner

POWER SUPPLY APPARATUS AND METHOD BASED ON PARASITIC POWER EXTRACTION

FIELD OF THE INVENTION

This invention relates to an apparatus and method for extracting power from a plurality of signals and supplying the extracted power as one or more dc voltages to a load device.

BACKGROUND OF THE INVENTION

It is known to obtain power from a single source and to convert to one or more categories of use. For example, U.S. Pat. No. 4,184,197 discloses dc-to-dc switching converters that obtain power from a single source and convert the power to one or more dc voltages. However, these converters do not have the capability of dealing with power extracted concurrently from two or more sources or the capability of extracting power from signals supplied by the sources.

In many applications, it may be desirable to provide power to a load device that has no readily available power source or that for economy of power consumption needs an alternative way of obtaining operating power. For example, a device designed as a retrofit to installed equipment may be unable to tap into the power source of the installed equipment.

There is a need for a power supply apparatus and method that is capable of obtaining power from alternative sources to supply operating power to a load device.

SUMMARY OF THE INVENTION

In a first embodiment of the apparatus of the present invention, a power extractor extracts voltage and/or current (referred to herein as voltage/current) from a plurality of potentially time-varying signals and provides first and second voltage/current signals. A power conversion circuit converts the first and second voltage/current signals to a plurality of dc voltages for a load device.

In one version of the first embodiment of the apparatus of the present invention, the first and second voltage/current signals are based on positive and negative-going portions, respectively, of the potentially time-varying signals. Preferably, the positive-going portions are combined in an additive manner to provide the first voltage/current signal and the negative-going portions are combined in an additive manner to provide the second voltage/current signal.

In the aforementioned version of the first embodiment of the present invention, the power extractor preferably comprises a diode network for each of the potentially time-varying signals. The diode networks are connected in parallel between first and second lines that carry the first and second voltage/current signals, respectively.

In another version of the first embodiment of the apparatus of the present invention, the power conversion circuit comprises a transformer circuit that combines the first and second voltage/current signals in an additive manner and provides the plurality of dc voltages. Preferably, the power conversion circuit includes a switch that switches the first and second voltage/current signals to the transformer.

In still another version of the first embodiment of the apparatus of the present invention, an optional power source is coupled in a predetermined manner to the power conversion circuit when the plurality of potentially time-varying signals provide inadequate power for generating the dc voltages.

In yet another version of the first embodiment of the apparatus of the present invention, the first and second voltage/current signals vary in magnitude based on a combination of the potentially time-varying signals.

In another version of the first embodiment of the apparatus of the present invention, a feedback circuit responds to a first one of the dc voltages to provide an error signal. The error signal is used by the power conversion circuit to regulate the first dc voltage. The feedback circuit preferably includes an error amplifier that has an output capacitance and a stable voltage supply connected in circuit with the error amplifier to substantially remove the effect of the output capacitance upon the power conversion circuit. Preferably, the stable voltage supplied by the stable voltage supply is derived from the first and second voltage/current signals.

The error amplifier comprises a transistor having its collector connected in circuit with the stable voltage supply and its emitter connected to provide the error signal to the power conversion circuit. Preferably, the transistor is a phototransistor that is optically coupled to a light emitting diode that is controlled by an active device in response to the first dc voltage.

In any of the aforementioned versions of the first embodiment of the apparatus of the present invention, the apparatus may optionally include first and second devices that each provide one or more of the potentially time-varying signals.

In a second embodiment of the apparatus of the present invention, a plurality of input stages and a plurality of output stages are connected in circuit with a transformer. A switching circuit switches the input stages to combine a first voltage/current signal and a second voltage/current signal in the transformer to provide a plurality of dc voltages in the output stages for the load device. Preferably, the input stages extract power from a plurality of potentially time-varying signals to provide the first and second voltage/current signals.

The dc voltages are preferably provided both when each of the potentially time-varying voltages has a non-zero magnitude or when one or more (but not all) of the potentially time-varying voltages has a magnitude of zero.

In one version of the second embodiment of the apparatus of the present invention, an optional input stage connects an optional input voltage source in circuit with the transformer. The optional input stage, the transformer, and the output stages co-act to provide the dc voltages.

The method of the present invention extracts first and second signal portions from a plurality of potentially time-varying signals. The first and second signal portions are combined to provide first and second voltage/current signals. The first and second voltage/current signals are combined through a transformer to provide the dc voltages.

Preferably, the first and second signal portions are positive- and negative-going portions such that the positive-going portions are combined in a partially additive manner to provide the first voltage/current signal and the negative-going portions are combined in a partially additive manner to provide the second voltage/current signal.

In another embodiment of the method of the present invention, the first and second voltage/current signals vary in magnitude based on a combination of the potentially time-varying signals. Preferably, the dc voltages are provided both when each of the potentially time-varying signals has a non-zero magnitude or when at least one but not all of the potentially time-varying signals has a magnitude of zero.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
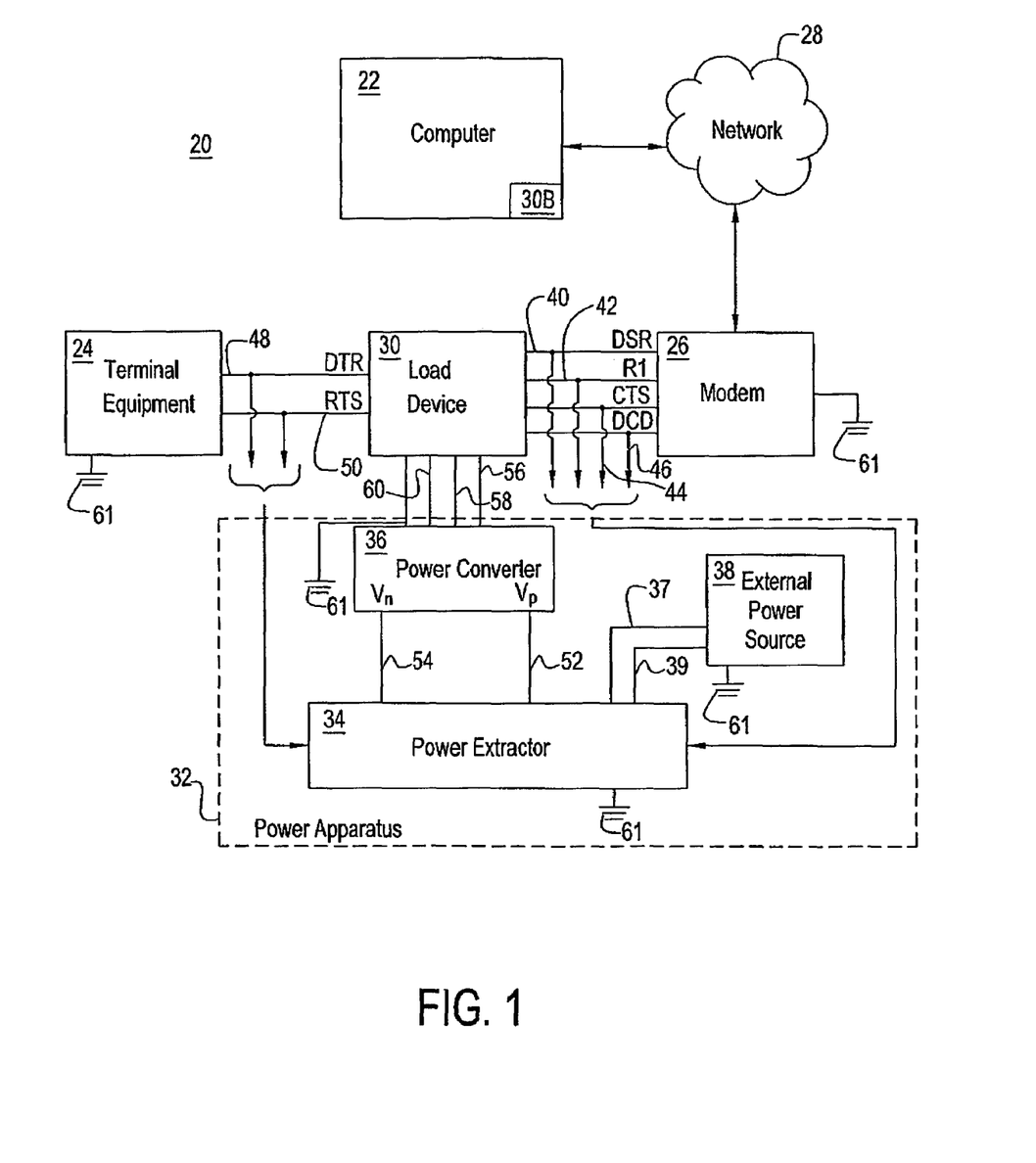
FIG. 1 is a block diagram of the power supply apparatus of the present invention connected in a system in which it may be used.

Referring to FIG. 1, a communication system 20 includes a computer 22 and a terminal equipment 24 interconnected for exchanging messages by a modem 26 and a network 28. A load device 30 is connected between modem 26 and terminal equipment 24. Load device 30 operates on the output signals of terminal equipment 24 and on the output signals of modem 26.

Load device 30, for example, may be a security device that is retrofitted onto terminal equipment 24 for the purpose of encoding security measures to communications that are outbound from terminal equipment 24 and decoding security measures from communications that are inbound from modem 26. Load device 30 is powered by dc voltages provided by a power apparatus 32 of the present invention. It will be apparent to those skilled in the art that a similar security measuring device or its software equivalent, designated as 30B in FIG. 1, is associated with computer 22. As a separate device, security measuring device 30B may be powered by power available from computer 22 or from a power apparatus, such as power apparatus 32 of the present invention.

Power apparatus 32 includes a power extractor 34, a power converter 36 and an optional external power source 38. Power extractor 34 is interconnected with a plurality of signal lines, namely, output signal lines 40, 42, 44, and 46 of modem 26 and output signal lines 48 and 50 of terminal equipment 24. Output signal lines 40, 42, 44, and 46 of modem 26 carry potentially time-varying signals identified as DSR, RI, CTS and DCD, respectively. Output signal lines 48 and 50 of terminal equipment 24 carry potentially time-varying signals identified as DTR and RTS, respectively.

Power extractor 34 extracts power (voltage and/or current) from potentially time-varying signals DSR, RI, CTS, DCD, DTR and RTS. That is, power extractor 34, like a parasite, takes power from these signals. Power extractor 34 provides the extracted power as first and second voltage/current signals on a Vp line 52 and on a Vn line 54, respectively.

Power converter 36 converts the first and second voltage/current signals on lines 52 and 54 into a plurality of dc voltages that are supplied to load device 30 via a plurality of supply lines 56, 58 and 60. Importantly, power apparatus 32, modem 26, load device 30, and terminal equipment 24 share a common reference potential, shown in FIG. 1, for example, as circuit ground 61.

External power source 38 provides power in the event the power extracted from the potentially time-varying signals DSR, RI, CTS, DCD, DTR and RTS is inadequate to power load device 30 or if the power extraction process materially impacts performance of communication system 20. To this end, external power source 38 provides ac or dc power via a pair of lines 37 and 39 to power extractor 34.

It will be apparent to those skilled in the art that communication system 20 is an example of a system in which power apparatus 32 can be used to power load device 30 and that power apparatus 32 can be used to power load devices in other systems. It will also be apparent to those skilled in the art that although power extractor 34 extracts power from two signals of terminal equipment 24 and four signals from modem 26, more or fewer signals could be used depending on the number of available signals and power needs of load device 30. It will also be apparent to those skilled in the art that although three supply lines are shown for three dc voltages, more or fewer supply lines and dc voltages are possible depending on the power needs of a particular load device 30.

For communication system 20, each of the potentially time-varying signals DSR, RI, CTS, DCD, DTR and RTS is expressed as a positive or negative voltage having a magnitude equal to or greater than a minimum value, for example, of 3.5 volts. The voltage sign (positive or negative) indicates a logic TRUE or FALSE state. The amount of current that can be drawn from the potentially time-varying signals is limited, with the voltage decreasing as more current is drawn. This interaction typically extends across all of the potentially time-varying signals from a given equipment source (e.g., terminal equipment 24) that are of the same voltage sign. The voltage signs of the potentially time-varying signals vary over time with normal initialization and message exchange traffic involving terminal equipment 24 and modem 26.

Power apparatus 32 of the present invention reacts to potentially time-varying signals DSR, RI, CTS, DCD, DTR and RTS, including the cessation of all current from a given source (e.g., terminal equipment 24) with a given voltage sign. When feasible, power apparatus 32 extracts the power required by load device 30 and detects when such extraction is not feasible.

Also, power extractor 34 extracts power from either or both terminal equipment 24 and modem 26. For example, when there are no inbound or outbound messages, neither terminal equipment 24 nor modem 26 is producing any potentially time-varying signals. However, as long as either terminal equipment 24 or modem 26 is powering its interface functions, power is still being provided in a time-invariant manner and dc voltages are still supplied to load device 30. Typically, signals DSR and DTR vary in polarity only during system initialization and thereafter may vary in magnitude or remain invariant during normal system operation. Should modem 26 receive and pass on an inbound message, signals RI and DCD may be potentially time varying in polarity, while signals DSR, DTR, RTS and CTS will be time invariant in polarity. Any or all of the signals may be time varying in magnitude. Power extractor 34 will extract power from both signals RI and DCD, whose polarity may be potentially time varying, and signals DSR, DTR, RTS and CTS, whose polarity is usually time-invariant, to supply dc voltages to load device 30. On the other hand, when only an outbound message is active, the time-invariant and potentially time varying roles of RI, DCD, RTS and CTS are reversed.

Figure 2:
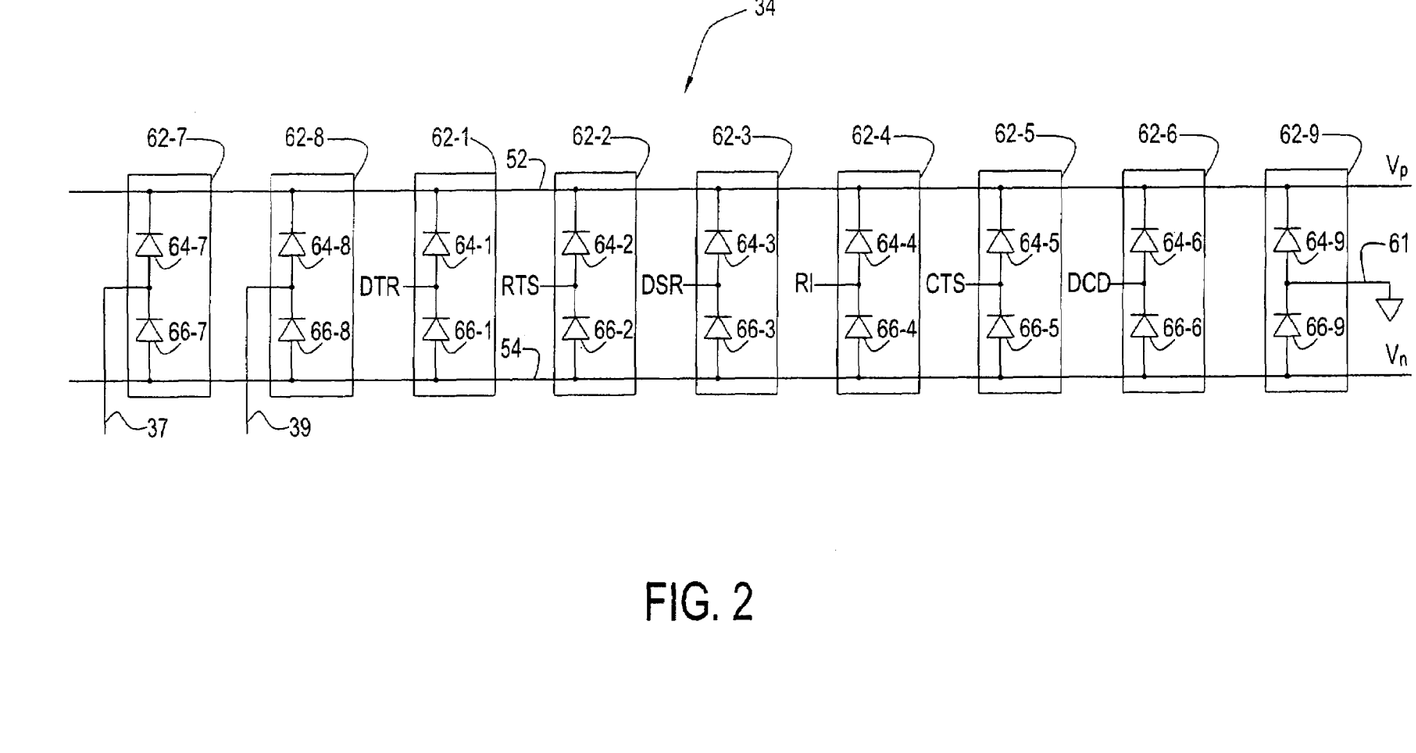
FIG. 2 is a circuit diagram of the power extractor of the power supply apparatus of FIG. 1.

Referring to FIG. 2, power extractor 34 extracts power from the potentially time-varying signals DSR, RI, CTS, DCD, DTR and RTS and presents the extracted power as first and second voltage/current signals on Vp line 52 and Vn line 54, respectively. Power extractor 34 includes a plurality of diode networks 62-1, 62-2, 62-3, 62-4, 62-5 and 62-6 that receive potentially time-varying signals DTR, RTS, DSR, RI, CTS and DCD, respectively, and that are connected in parallel between Vp line 52 and Vn line 54.

Power extractor 34 also includes additional diode networks 62-7 and 62-8 that are connected to receive power via lines 37 and 39 from an external power source 38 of an appropriate voltage range that either shares the common ground potential 61 or has a floating ground.

Alternative methods of providing an alternate power source via an isolated primary winding of the power converter 36, together with necessary control signals, will be apparent to those skilled in the art of power supply design. The method of the present invention is preferred for its lower complexity and automatic switching where the voltage range and ground potential of the external voltage source permits its use.

Power extractor 34 also includes additional diode network 62-9 connected to circuit ground, which establishes a limiting voltage for Vp line 52 and Vn line 54 when all of the other power sources are non-contributing to that voltage.

Since each of the diode networks is substantially similar, only diode networks 62-1 and 62-9 will be described in detail. Diode network 62-1 includes an upper diode 64-1 and a lower diode 66-1 connected in series between Vp line 52 and Vn line 54. Potentially time-varying signal DTR is received at the junction of upper diode 64-1 and lower diode 66-1. Diode network 62-9 includes an upper diode 64-9 and a lower diode 66-9 connected in series between Vp line 52 and Vn line 54. The common ground is tied to the junction of upper diode 64-9 and lower diode 66-9.

Considering the operation of diode networks 62-1 through 62-6 and 62-9, the diodes extract the instantaneous maximum and minimum voltages from signals DTR, RTS, DSR, RI, CTS, DCD and circuit ground and provide addition of currents of such signals that are at those same maximum and minimum voltages. Since the nature of the sources of these signals is such that their voltages decrease in magnitude as the current loading on those sources increases, the combined maximum/minimum voltage/current addition function causes the number of contributing voltage sources to increase as the current draw increases until, in the limiting case, all inputs of the same polarity are contributing current to the appropriate one of Vp line 52 and Vn line 54.

For example, when signal DTR is +5.4 V and signal RTS is −5.2 V, both from terminal equipment 24, and signals DSR and DCD are +5.7 V and signals RI and CTS are −5.4 V, all from modem 26, and when the diodes of networks 62-1 through 62-6 each have a forward diode voltage drop of 0.6 V, then the no-load voltages at Vp line 52 and Vn line 54 are +5.1V and −4.8 V respectively, sourced by signals DSR, DCD, RI and CTS, through diodes 64-3 and 64-4 for Vp line 52, and 66-5 and 66-6 for Vn line 54, respectively. As the load on the V+ and V− lines increases, the voltages sourced by the modem 26 typically decrease. When the positive voltage sourced on DSR and DCD reaches that of DTR, then signal DTR begins to contribute current to Vp line 52. Similarly, when the negative voltage sourced on RI and CTS matches that of RTS, then signal CTS begins to contribute current to Vn line 54.

It may happen that all non-zero signals are of the same polarity. By way of example for the purpose of description, signal RI may not be used in a given type of system, in which case it may be left unconnected and floating. If such a system is capable of sending and receiving at the same time, then when both are occurring typically all of the other signals, DTR, CTS, DSR, RTS and DCD, have the same high polarity. In this case Vp line 52 is driven by the higher of the voltages presented by these signals, all of diodes 64-1, 64-2, 64-3, 64-5 and 64-6 are in conduction and all of diodes 66-1, 66-2, 66-3, 66-5 and 66-6 are blocking. Diode 66-9 now establishes the voltage on Vn line 54 as +0.4 V, one forward diode voltage drop above ground. For this situation, both Vp and Vn are positive, with Vp being more positive.

If external power source 38 is connected to lines 37 and 39, then diode networks 62-7 and 62-8 become active and contribute current to Vp line 52 and Vn line 54 when the connected power source is presenting a voltage that, after the forward diode voltage drops of diodes 64-1, 64-2, 66-1 and 66-2, is greater than that otherwise presented on Vp line 52 and Vn line 54. The reason why external power source 38 must be referenced to the common ground, or have a floating ground reference, is now apparent. Likewise, the maximum magnitude voltage presented by external power source 38 will, after the appropriate forward diode voltage drops, be presented on Vp line 52 and Vn line 54.

The maximum magnitude voltages on Vp line 52 and Vn line 54 determine the required minimums for the reverse breakdown voltage ratings of all of the diodes in power extractor 34. The reverse breakdown voltages of diodes 64-9 and 66-9 must be greater than the maximum voltages for Vp line 52 and Vn line 54, respectively. The reverse breakdown voltages of all of the other diodes of power extractor 34 must be greater than the sum of the maximum magnitude voltage of whichever of Vp line 52 or Vn line 54 to which they are directly connected, plus the maximum magnitude of the voltage of opposite polarity to said Vp line 52 or Vn line 54 that can be presented at the input signal terminal to which the opposite end of the diode is directly connected.

By way of example for the purpose of description, if the maximum magnitude of any continuous voltage presented at signals DTR, RTS, DSR, RI, CTS and DCD is 15 V, and external power source 38 can have a dc voltage in the range of 6 V to 24 V in magnitude or an ac rms voltage of 24 V ±5%, all of which are readily available external power sources, then the diodes of network 62-9 require a 25 V or greater reverse breakdown voltage, those of networks 62-1 through 62-6 require a 40 V or greater reverse breakdown voltage, and those of networks 62-7 and 62-8 require a 60 V or greater reverse breakdown voltage. The corresponding forward voltage drops of such diodes may then be 0.4 V, 0.6 V and 1.0 V, respectively, for these three classes of diode networks.

Figure 3:
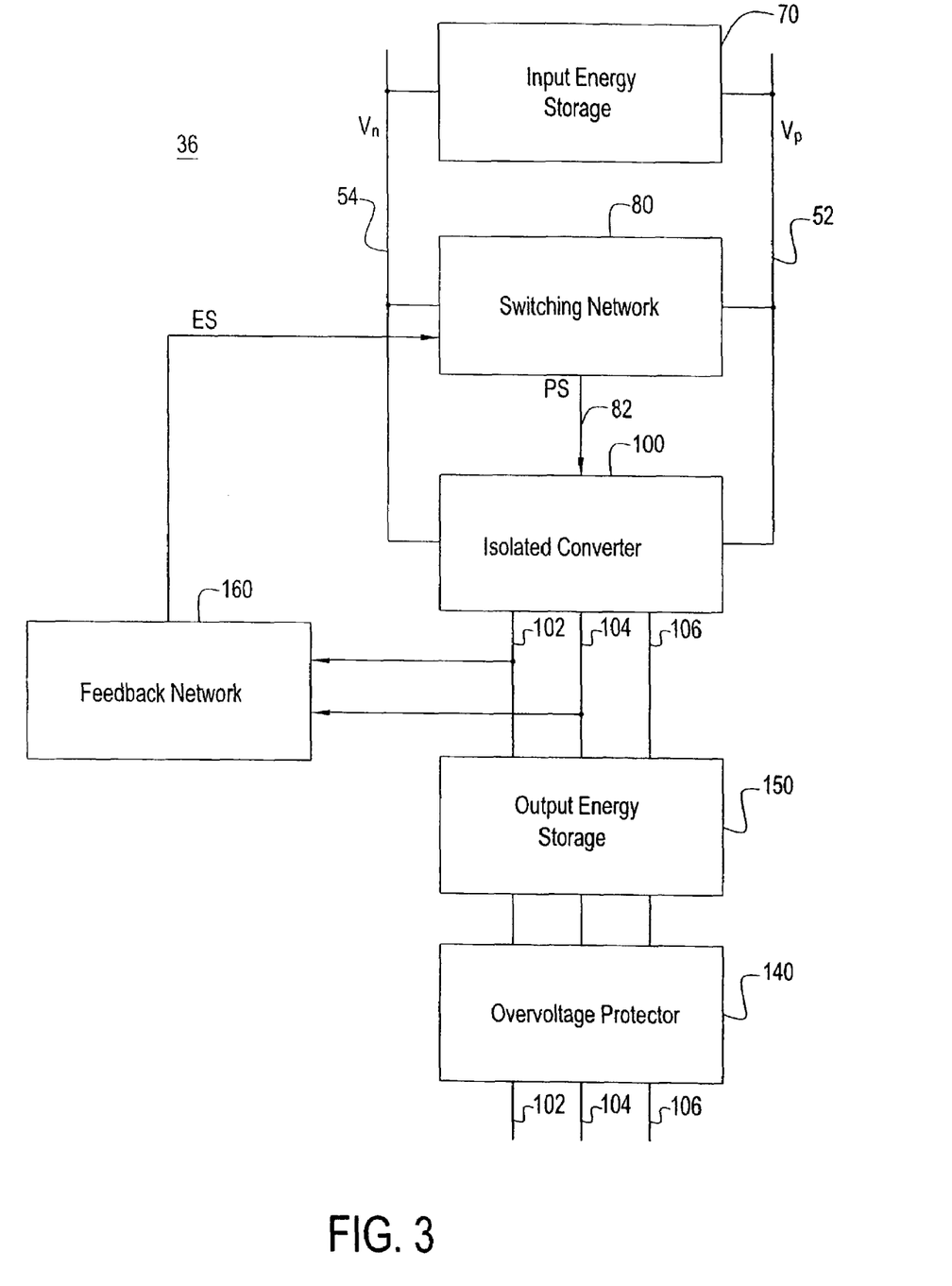
FIG. 3 is a block diagram of the power converter of the power supply apparatus of FIG. 1.

Referring to FIG. 3, power converter 36 includes an input energy storage 70, a switching network 80, an isolated converter 100, an output energy storage 150, an overvoltage protector 140 and a feedback network 160. Input energy storage 70, switching network 80 and isolated converter 100 are connected to Vp line 52 and Vn line 54.

Input energy storage 70 serves multiple purposes. It smoothes out the rapid transients in the voltages on Vp line 52 and Vn line 54 caused by abrupt changes in polarity of the signals DTR, RTS, DSR, RI, CTS and DCD. It provides the traditional smoothing of ac inputs known to those versed in the art of power supply design. Also, it recaptures any energy reflected back to the input by switching network 80 and isolated converter 100 in a manner well known to those versed in the art of power supply design.

Figure 4:
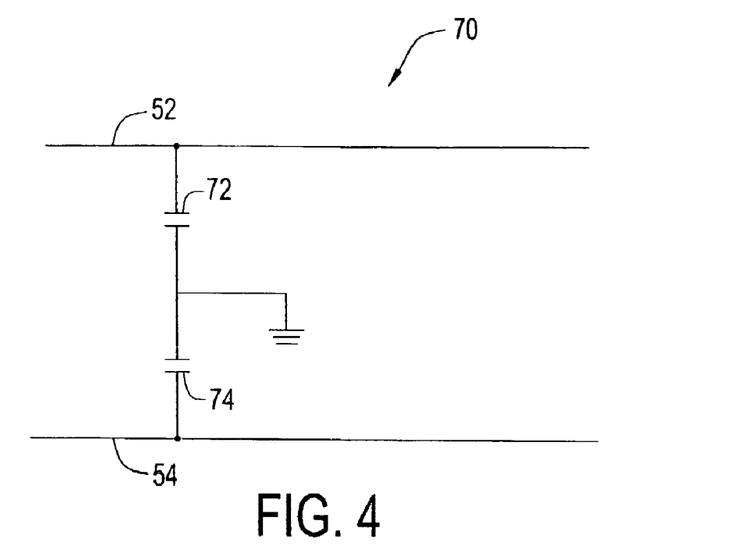
FIG. 4 is a circuit diagram of the input energy storage of the power converter of FIG. 3.

Referring to FIG. 4, input energy storage 70 includes capacitors 72 and 74 connected between circuit ground and Vp line 52 and Vn line 54, respectively. Capacitors 72 and 74 serve as energy storage devices for Vp line 52 and Vn line 54, respectively, as delivered by power extractor 34 and also serve to recapture any switching energy that may be returned from switching network 80 and isolated converter 100.

Referring again to FIG. 3, switching network 80 provides a switching signal on a line 82 to isolated converter 100. Isolated converter 100 responds to the switching signal on line 82 to convert the time-varying signals on Vp line 52 and Vn line 54 to a plurality of dc output voltages on lines 102, 104 and 106. Output energy storage network 150 provides charge (energy) storage, while overvoltage protector 140 provides overvoltage protection for dc voltages on each of the lines 102, 104 and 106.

Feedback network 160 is operable to control switching network 80 and isolated converter 100 to regulate the dc output voltage on at least one of the lines 102, 104 and 106. By way of example for the purpose of description, the dc voltage on line 104 will be shown and described as being regulated. Feedback network 80 responds to variations of the dc voltage on line 104 with respect to a reference voltage to develop an error signal ES on line 162. Error signal ES controls the timing of the switching signal on line 82 and the energy coupled from Vp line 52 and Vn line 54 to isolated converter 100. As the dc output voltage on line 104 varies from a desired value, error signal ES will also vary in a manner to control switching network 80 to correct the dc voltage on line 104 to the desired value.

Figure 5:
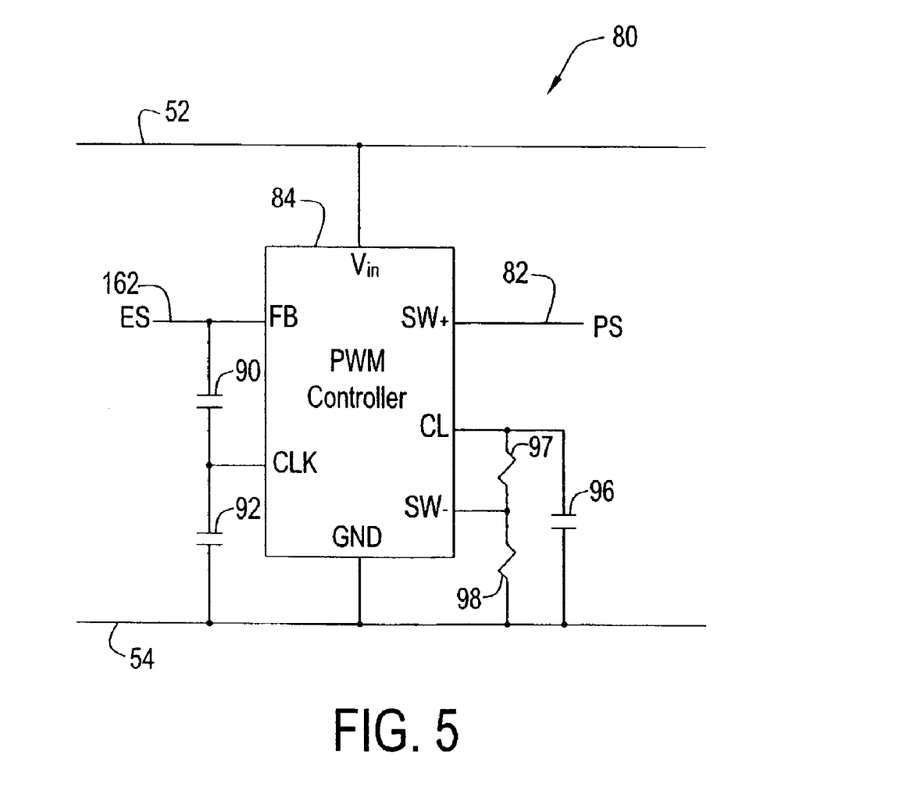
FIG. 5 is a circuit diagram of the switching network of the power converter of FIG. 3.

Referring to FIG. 5, switching network 80 includes a pulse width modulation (PWM) controller 84 having its Vin and GND terminals connected to Vp line 52 and Vn line 54, respectively. PWM controller 84 has its control feedback terminal FB connected to feedback line 162 and its power switching terminals SW+ and SW− connected to line 82 and Vn line 54, respectively, the latter through a very small resistor 98 to provide for over-current protection.

PWM controller 84 causes the slowly time-varying signals on lines 52 and 54 to alternately route through two different paths, which in turn causes current to flow through the primary winding of the transformer of isolated converter 100 first in one direction and then in the alternate direction. By such rapid changes in conduction paths, PWM controller 84 converts the quasi-dc signals of lines 52 and 54 into an ac (alternating current) signal flowing through isolated converter 100. This ac signal can be coupled through a transformer, thereby providing the isolation between input and output voltages characteristic of an isolated converter. All of the fundamental principles of such localized conversion from dc to ac are well known to those versed in the art of power supply design.

The actual means by which PWM controller 84 causes alternation between the two paths is as follows. PWM controller 84 generates or receives at its CLK terminal a rapidly altering clock signal. The clock signal typically has a frequency between 50 kHz and 5 MHz, but can be more or less than that. Operation of PWM controller 84 is coupled to the phases of this cyclic clock signal.

PWM controller 84 also receives a feedback voltage ES at its terminal FB. PWM controller 84 compares feedback signal ES with an internally or externally generated reference voltage, the latter typically within the range of 0.85 V to 2.8 V. When the voltage at terminal FB is less than the reference voltage, then PWM controller 84 enables a low-resistance conductive path between terminals SW+ and SW− during part of each cycle of the input clock. The duration of such conductive phase of the clock cycle is a function of the voltage difference between the feedback voltage presented at terminal FB and the reference voltage, so that as the two voltages approach each other in value, the conductive phase diminishes to zero duration.

Because real circuits have a small but non-zero switching time, some PWM controllers such as just described vary the frequency of the actual clock that is used for decision making and phase duration computations. For example, some PWM controllers decrease the effective clock frequency by a factor of five when the duration of the conductive phase drops below 10% or rises above 90% of the input clock's period. The decrease in effective frequency enables the controller to more closely approach the 0% and 100% duty cycle limits of an idealized PWM controller.

In the design of the present invention, terminal SW+ of PWM controller 84 is connected to signal PS of the isolated converter 82, while PWM controller terminal SW− is connected to V− line 54, either directly or through resistor 98. In the preferred embodiment, resistor 98 has a small resistance so as to limit the maximum current through PWM controller 84.

PWM controller 84 may be any suitable PWM controller, known presently or in the future. Preferably, PWM controller 84 is a model LM2578A Switching Regulator available from National Semiconductor Corporation of Santa Clara, Calif., USA. It is this specific type of controller that, by way of example, is detailed as PWM controller 84 in FIG. 5 and the following paragraphs.

Capacitor 92 is connected between the GND terminal and the CLK terminal of PWM controller 84. The value of capacitor 92 is selected to establish the desired frequency of operation of said controller, for example, 100 KHz. A compensation capacitor 90 is connected between the FB and CLK terminals to facilitate synchronous operation.

Switch terminal SW+ is connected to converter 100 via line 82, while switch terminal SW− is connected to Vn line 54 through resistor 98. This model of PWM controller has a separate current limiting input terminal CL. In the presented mode of operation when the difference between the voltage at the CL terminal and that at the GND terminal exceeds a predetermined value, conduction between terminals SW+ and SW− is suppressed. Resistors 97 and 98 establish this current value. A capacitor 96 establishes a time constant used to suppress transients caused by interactions between the switching actions of PWM controller 84 and the inductance and capacitance of isolated converter 100.

Figure 6A:
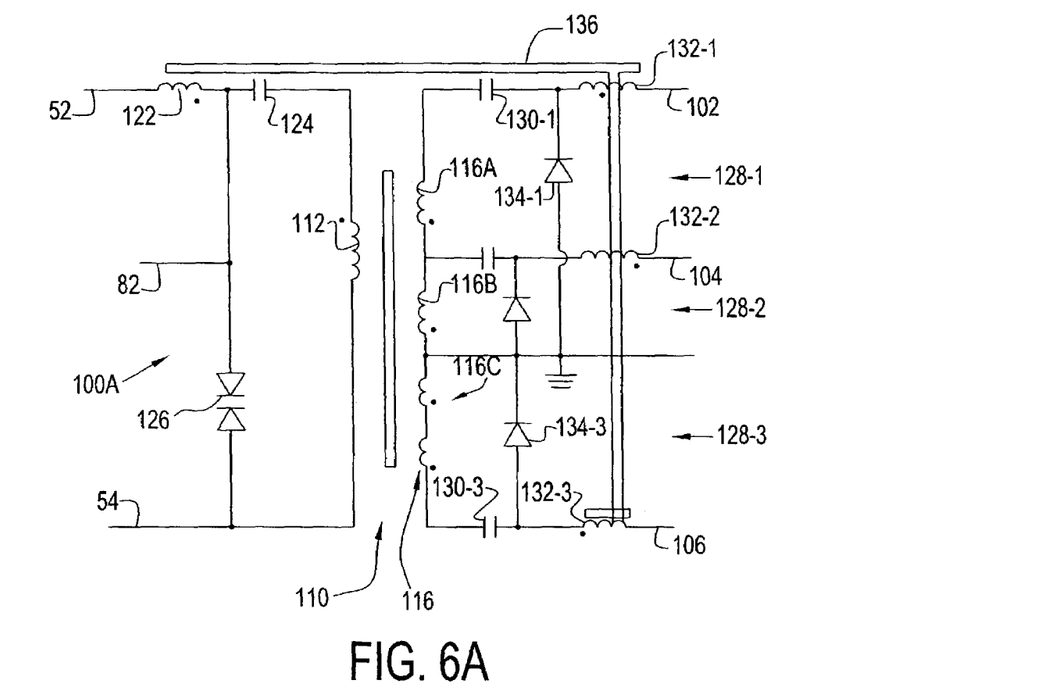
FIG. 6A is a circuit diagram of an embodiment of the isolated converter of the power converter of FIG. 3.

Referring to FIG. 6A, a first embodiment of an isolated converter 100 of the present invention is shown as a converter 100A. Converter 100A includes a transformer 110 that has a primary winding 112 and a tapped secondary winding 116 that has three series connected winding portions 116A, 116B and 116C. The junction of secondary winding portions 116B and 116C is connected to circuit ground. It will be apparent to those skilled in the art that tapped secondary winding 116 can alternatively be three series connected secondary windings.

A series connected inductor 122 and capacitor 124 connect Vp line 52 to the dotted end of primary winding 112. The undotted end of primary winding 112 is connected to Vn line 54. The junction of inductor 122 and capacitor 124 is connected to line 82. A bipolar transient voltage suppression device 126 is connected between Vp line 52 and Vn line 54 to suppress high voltage transient spikes that occur due to the leakage inductance of transformer 110. Bipolar transient voltage suppression device 126, for example, may be a 600 W axial transient voltage suppressor, part number P6KE36CA, available from Littelfuse of Des Plaines, Ill., U.S.A.

Secondary winding portions 116A, 116B and 116C are connected to an output stage 128-1, an output stage 128-2 and an output stage 128-3, respectively. Output stages 128-1, 128-2 and 128-3 are connected to output lines 102, 104, and 106, respectively. Output stages 128-1, 128-2 and 128-3 are substantially identical and have identical types of components that bear identical reference numerals with a suffix of 1 for output stage 128-1, 2 for output stage 128-2 and 3 for output stage 128-3. Only output stage 128-1 will be described in detail with any variance of output stage 128-2 or 128-3 noted below.

Output stage 128-1 includes a capacitor 130-1, an inductor 132-1 and a diode 134-1. Capacitor 130-1 and inductor 132-1 are connected in series with the undotted end of secondary winding portion 116A and output line 102. Diode 134-1 is connected between circuit ground and the junction of capacitor 130-1 and inductor 132-1.

Output stage 128-3 differs in the respect that capacitor 130-3 is connected to the dotted end of secondary winding portion 116C and that diode 134-3 has an opposite polarity to that of diode 134-1. These variances are necessary to provide a negative dc voltage on output line 106.

In the preferred embodiment, inductors 132-1, 132-2 and 132-3 share a common core 136 of magnetically permeable material with inductor 122, as taught by U.S. Pat. No. 4,184,197, which is incorporated herein by reference, particularly FIG. 13 thereof. Other couplings of the inductors are possible, including coupling of all of the inductors of isolated inverter 100A on a common core, as disclosed by the above-mentioned patent. The operation of switching network 100A is identical to that described in the above-mentioned patent, with emphasis on FIGS. 12 and 13 thereof.

Converter 100A has the ability to both upconvert and downconvert voltage in a single design without use of a transformer. As a result of this capability, it tends to induce less voltage stress on its constituent components than do other types of power supply designs.

Figure 6B:
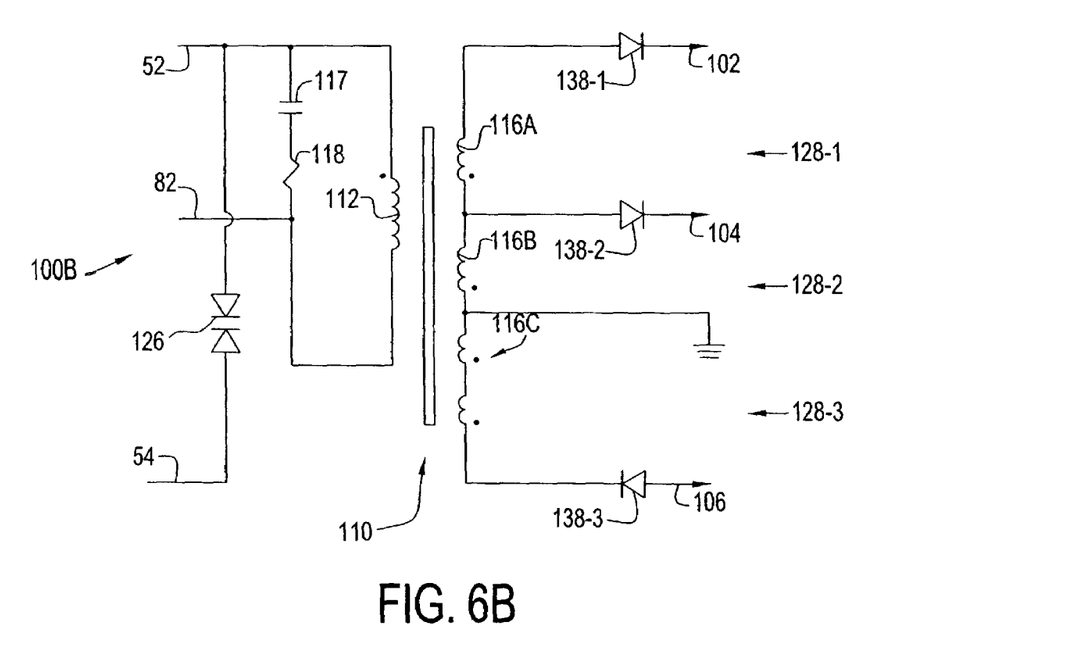
FIG. 6B is a circuit diagram of another embodiment of the isolated converter of the power converter of FIG. 3.

Referring to FIG. 6B, a second embodiment of isolated converter 100 is shown as a converter 100B. Converter 100B includes some components that are identical to and bear the same reference numerals as components in converter 100A.

The Vp line 52 is connected to the dotted end of primary winding 112. The undotted end of primary winding 112 is connected to switching signal line 82. A series connected capacitor 117 and resistor 118 is connected across primary winding 112 to facilitate resonant operation and recover most of the excess energy caused by switching transients and the leakage inductance of transformer 110. A bipolar transient voltage suppression device 126 is connected between Vp line 52 and Vn line 54 to suppress high voltage transient spikes that occur due to the leakage inductance of transformer 110.

Output stages 128-1, 128-2 and 128-3 include diodes 138-1, 138-2 and 138-3 that connect secondary winding portions 116A, 116B and 116C to output lines 102, 104 and 106, respectively. Diodes 138-1 and 138-2 are connected to the undotted ends of secondary winding portions 116A and 116B, and have a polarity so as to provide positive dc voltages on lines 102 and 104. Diode 138-3 is connected to the dotted end of secondary winding portion 116C and is oriented to provide a negative dc voltage on line 106.

Converter 100B is a switching regulator converter design of the type known generically as the flyback topology, so-called because the actual energy transfer across the transformer occurs primarily during the non-conducting "flyback" phase of the PWM controller's conduction cycle. With respect to the present invention, the flyback topology induces greater voltage stress on its components than the topology of converter 100A and requires a larger input voltage differential between the Vp and Vn lines before it can operate. However, it has the advantage of requiring fewer components and, in particular, less than half the number of inductive windings of converter 100A topology for the described single-input triple-output application.

Because dotting of the ends of inductors is merely a convention for aligning windings with respect to a common flux path, it is apparent that the dots could be moved to the other end of each inductor in either converter 100A or converter 100B, provided that all dots on the converter's inductors were so changed simultaneously.

Figure 7:
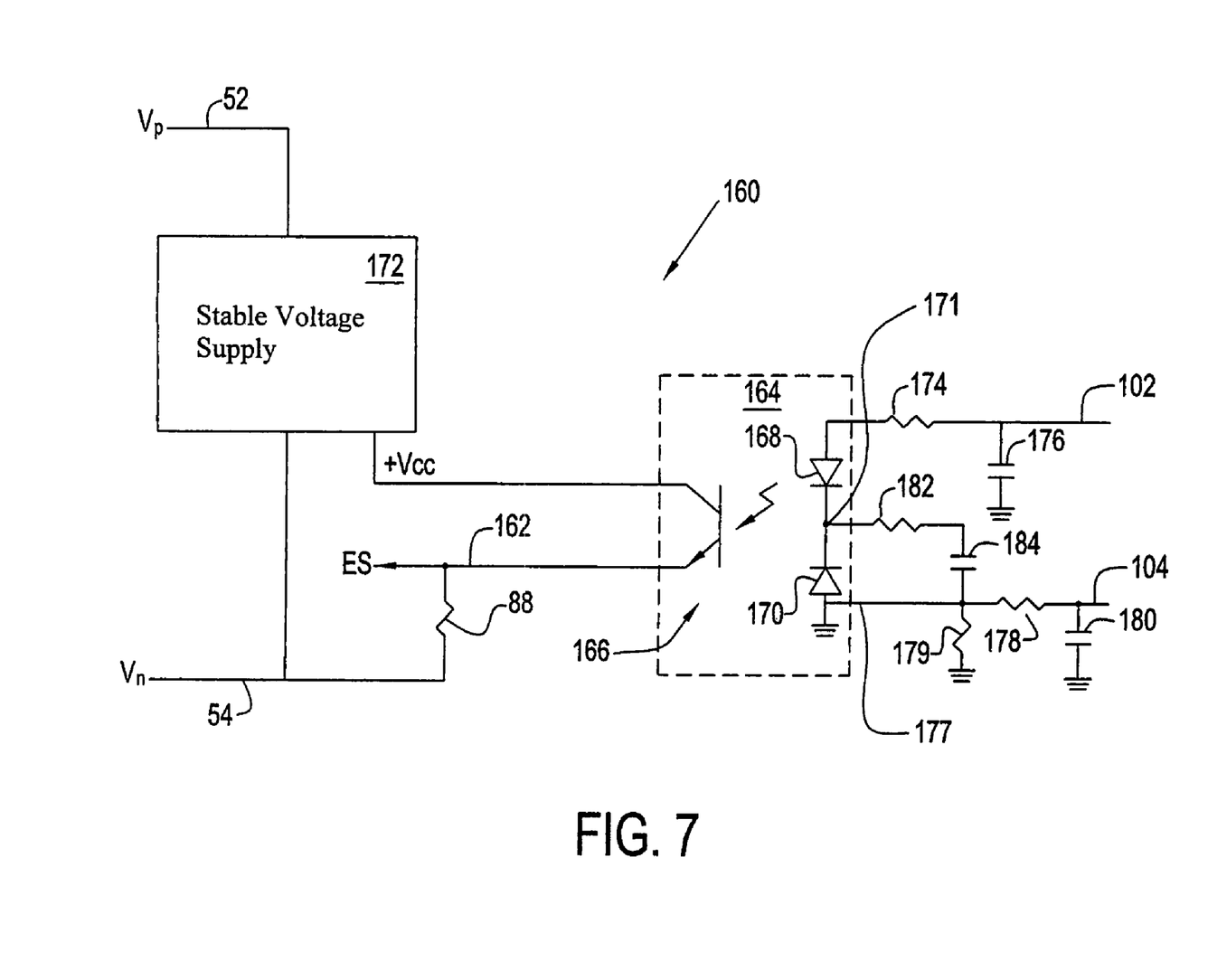
FIG. 7 is a block diagram, in part, and a circuit diagram, in part, of the feedback network of the power converter of FIG. 3.

Referring to FIG. 7, feedback network 160 includes an optically isolated error amplifier 164 that includes (1) an optoisolator having a light emitting diode (LED) 168 optically coupled to a phototransistor 166, and (2) a precision programmable shunt reference 170. Phototransistor 166 has its collector coupled to a stable voltage supply 172, while its emitter is connected to feedback line 162 and to Vn line 52 through a current limiting resistor 88. To this end, the optically isolated error amplifier 164 may be an integrated part, such as a Fairchild FOD2741C, available from Fairchild Semiconductor Corp. of South Portland, Me., U.S.A. It may also be composed of an optoisolator separate from a means of controlling the current of LED 168, such as a shunt reference, in a manner well known to those versed in the art of power supply design.

Stable voltage supply 172 is preferably powered via Vp line 52 and Vn line 54, either directly or through a voltage reducing resistor network. Its purpose is to provide a stable voltage reference to phototransistor 166 relative to the reference Vn line 54, in order to remove the effect of the inherently large capacitance of phototransistor 166 from line 162 and PWM controller 84. To this end, voltage supply 172 may be a low voltage, low current voltage regulator such as a National LP2951 from the previously identified National Semiconductor Corp.

The anode of LED 168 is connected to a suitable voltage source, such as output line 102 via a current limiting series resistor 174 sized to minimize and limit power dissipation. An optional shunt capacitor 176 is used to suppress high frequency voltage transients. The control electrode of programmable shunt reference 170 is connected to output line 104 via a resistive divider network comprised of series resistor 178 and shunt resistor 179. An optional shunt capacitor 180 is used to suppress high frequency voltage transients. A resistor 182 and a capacitor 184 are connected in series between the control node and the compensation feedback node of programmable shunt reference 170 to provide a low pass filtered, error compensation feedback to the shunt reference.

In operation, feedback network 160 uses a precision resistive divider comprised of resistors 178 and 179, to develop at node 177 a voltage that is a predetermined fraction of the voltage on output line 104. Programmable shunt reference 170 generates an internal voltage that is the lesser of a fixed predetermined voltage, for example 2.5 V for the Fairchild FOD2741C, or a voltage that is slightly reduced from that present at a node 171, which is the output of the cathode of LED 168, which even at zero current is, at most, the voltage of the voltage source of LED 168, in this case, output 102.

LED 168 will not begin to emit light until the voltage at its cathode is more than the predetermined reference voltage of the programmable shunt reference 170. Thus in this example, LED 168 will not begin to emit light until the voltage at its cathode is 2.5 V. The feedback to the shunt reference controls the current from LED 168 through shunt reference 170. When that feedback voltage is below the internally generated voltage of programmable shunt reference 170, shunt reference 170 conducts current and LED 168 illuminates. When that voltage is above the internally generated voltage, LED 168 stays dark. In this manner, shunt reference 170 and LED 168 jointly convert the result of the comparison by programmable shunt reference 170 of the voltage at node 177 to its internal voltage into photons that cross a gap within LED 168 to the floating-gate phototransistor 166. Phototransistor 166 conducts more or less current depending on the number of photons it receives per unit time. This in turn causes the voltage drop across resistor 88 to change, modulating feedback voltage ES presented on line 162 to switching network 80 (shown in FIG. 3).

In actual operation, shunt reference 170 and LED 168 work to provide a non-linear but continuous function of current flow through phototransistor 166 as a function of the difference between the shunt reference's internally generated voltage and the voltage at node 177. The continuous nature of this function provides for fine control of feedback network 160 as the two voltages converge.

Figure 8A:
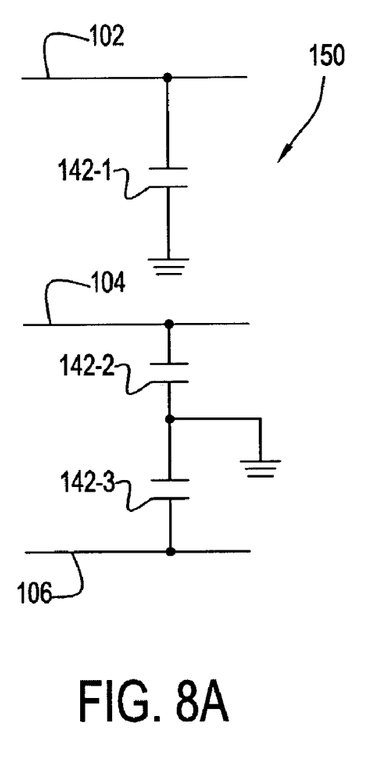
FIG. 8A is a circuit diagram of the output energy storage of the power converter of FIG. 3.

Referring to FIG. 8A, output energy storage network 150 includes for each output line 102, 104 and 106 a respective capacitor 142-1, 142-2 and 142-3 connected between the respective output line and circuit ground. For example, capacitor 142-1 is connected in parallel between output line 102 and circuit ground, to provide energy storage both for rapid transients in the load on output line 102 and for smoothing power transfer during the various phases in each cycle of operation of isolated converter 100.

Figure 8B:
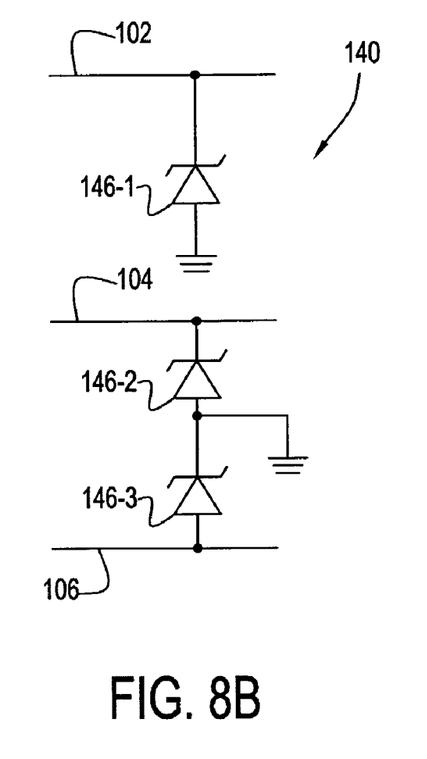
FIG. 8B is a circuit diagram of the overvoltage protector of the power converter of FIG. 3.

Referring to FIG. 8B, overvoltage network 140 includes for each output line 102, 104 and 106 a respective protective Zener diode 146-1, 146-2 and 146-3 connected between the respective output line and circuit ground. For example, diode 146-1 is connected in parallel between output line 102 and circuit ground. Zener diode 146-1 provides overvoltage protection through its well understood avalanche breakdown mechanism, which occurs at an approximate voltage determined by the diode's construction.

The present invention having been thus described with particular reference to the preferred forms thereof, it will be obvious that various changes and modifications may be made therein without departing from the spirit and scope of the present invention as defined in the appended claims.

What is claimed is:

1. Apparatus for supplying power to a load device that is unable to tap into a power source, comprising:

a plurality of signal lines connected to said load device that is unable to tap into a power source;

at least a first device that provides first and second potentially time varying signals on first and second ones of said signal lines to said load device, wherein said first and second time varying signals are information bearing signals;

a power extractor that extracts voltage/current from said first and second potentially time varying signals and provides first and second voltage/current signals, wherein positive going portions of said first and second potentially time varying signals are combined in an additive manner to provide said first voltage/current signal and negative going portions said first and second potentially time varying signals are combined in an additive manner to provide said second voltage/current signal; and a power conversion circuit that converts said first and second voltage/current signals to a plurality of dc voltages that are provided to said load device that is unable to tap into a power source.

2. The apparatus of claim 1, wherein said first and second voltage/current signals are each limited in magnitude.

3. The apparatus of claim 1, wherein said power extractor comprises a diode network for each of said first and second potentially time varying signals.

4. The apparatus of claim 3, wherein said diode networks are connected in parallel between first and second lines that carry said first and second voltage/current signals, respectively.

5. The apparatus of claim 1, wherein said first and second voltage/current signals have a common reference potential.

6. The apparatus of claim 1, wherein said power conversion circuit further comprises a transformer circuit that combines said first and second voltage/current signals in an additive manner into said dc voltages.

7. The apparatus of claim 6, wherein said power conversion circuit comprises a switch that simultaneously switches said first and second voltage/current signals to said transformer circuit.

8. The apparatus of claim 1, further comprising a separate power source and means for coupling said separate power source to said power conversion circuit when said first and second potentially time varying signals provide inadequate power for generating said plurality of dc voltages.

9. The apparatus of claim 8, wherein said means for coupling comprises an array of diode pairs, each connected as a half bridge to a corresponding input signal, and an additional diode pair connected as a half bridge to a common ground.

10. An apparatus for supplying power to a load device comprising:

a plurality of signal lines connected to said load device;

at least a first device that provides first and second potentially time varying signals on first and second ones of said signal lines to said load device;

a power extractor that extracts voltage/current from said first and second potentially time varying signals and provides first and second voltage/current signals;

a power conversion circuit that converts said first and second voltage/current signals to a plurality of dc voltages that are provided to said load device: and a second device that provides at least a third one of said potentially time varying signals on a third one of said signal lines.

11. The apparatus of claim 10, wherein said load device is interconnected with said first and second devices via said plurality of signal lines.

12. The apparatus of claim 1, wherein said first and second voltage/current signals vary in magnitude based on a combination of said first and second potentially time varying signals.

13. The apparatus of claim 1, wherein said first voltage/current signal has a first magnitude that is greater than a second magnitude of said second voltage/current signal, and both of said first and second voltage/current signals are positive.

14. The apparatus of claim 1, further comprising a feedback circuit responsive to a first one of said dc voltages to provide an error signal, and wherein said power conversion circuit responds to said error signal to regulate said first dc voltage.

15. The apparatus of claim 14, wherein said feedback circuit comprises an error amplifier that has an output capacitance and a stable voltage supply connected in circuit with said error amplifier to substantially remove the effect of said output capacitance upon said power conversion circuit.

16. The apparatus of claim 15, wherein said stable voltage supply provides a stable voltage to said error amplifier, and wherein said stable voltage is derived from said first and second voltage/current signals.

17. The apparatus of claim 16, wherein said error amplifier comprises a transistor having its collector connected in circuit with said stable voltage supply and its emitter connected to provide said error signal to said power conversion circuit.

18. The apparatus of claim 17, wherein said transistor is a phototransistor that is optically coupled to a light emitting diode that is controlled by an active device in response to said first dc voltage.

19. Apparatus for supplying power to a load device that is unable to tap into a power source comprising:

a plurality of input stages and a plurality of output stages connected in circuit with a transformer, wherein said input stages extract power from a plurality of potentially time varying signals to produce a first voltage/current signal and a second voltage/current signal, and wherein positive going portions of said first and second potentially time varying signals are combined in an additive manner to provide said first voltage/current signal and negative going portions said first and second potentially time varying signals are combined in an additive manner to provide said second voltage/current signal, wherein said first and second time varying signals are information bearing signals; and a switching circuit that switches said input stages to combine said first voltage/current signal and said second voltage/current signal in said transformer to provide a plurality of dc voltages in said output stages for said load device that is unable to tap into a power source.

20. The apparatus of claim 19, wherein said plurality of dc voltages is provided when each of said potentially time varying voltages has a non-zero magnitude or when some but not all of said potentially time varying voltages has a magnitude of zero.

21. The apparatus of claim 19, further comprising an optional input stage for connecting an optional input voltage source in circuit with said transformer, and wherein said optional input stage, said transformer and said output stages co-act to provide said plurality of dc voltages.

22. The apparatus of claim 19, wherein at least one of said dc voltages is positive and at least one of said dc voltages is negative.

23. A method for supplying power to a load device that is unable to tap into a power source comprising:

providing a plurality of signal lines connected to said load device that is unable to tap into a power source;

providing at least a first device that provides first and second potentially time varying signals on first and second ones of said signal lines to said load device, wherein said first and second time varying signals are information bearing signals;

extracting positive going and negative going portions from first and second potentially time varying signals;

combining said positive going portions in an additive manner to provide a first voltage/current signal and said negative going portions in an additive manner to provide a second voltage/current signal; and converting said first and second voltage/current signals to a plurality of dc voltages that are provided to said load device that is unable to tap into a power source.

24. The method of claim 23, wherein said dc voltages are provided both when each of said potentially time varying signals has a non-zero magnitude or when at least one, but not all, of said potentially time varying signals has a magnitude of zero.

25. The method of claim 23, wherein said first and second voltage/current signals vary in magnitude and polarity based on a combination of said potentially time varying signals.

* * * * *